March 27, 1951  B. OSTENDORF, JR., ET AL  2,546,370
AZIMUTH INDICATING CIRCUIT
Filed Aug. 31, 1948  3 Sheets-Sheet 1
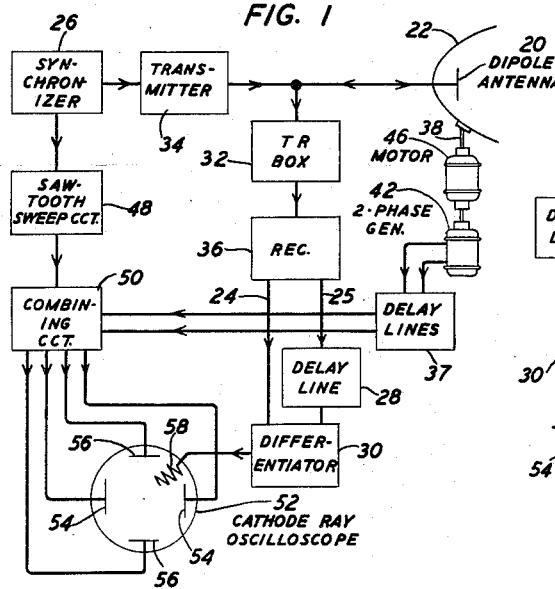
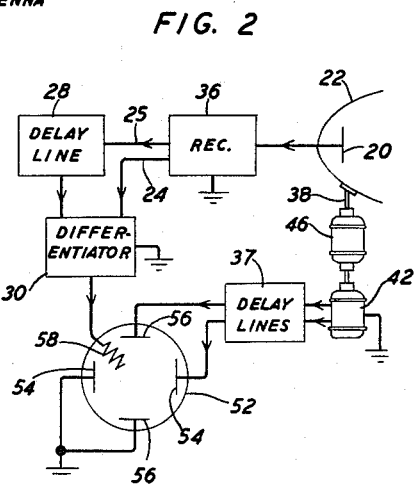
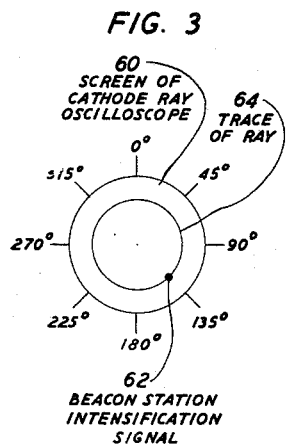
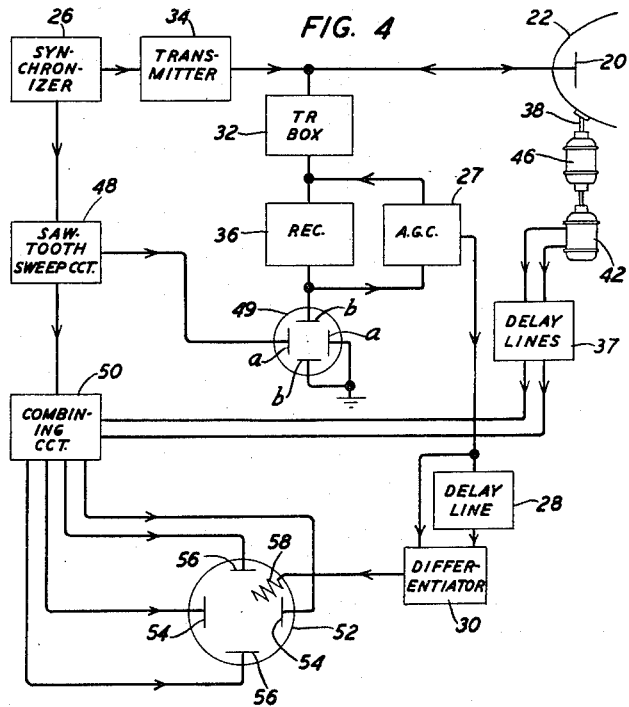
INVENTORS: B. OSTENDORF JR.
W. T. REA
BY H. O. Wright
ATTORNEY March 27, 1951 B. OSTENDORF, JR., ET AL 2,546,370
AZIMUTH INDICATING CIRCUIT
Filed Aug. 31, 1948 3 Sheets-Sheet 2
FIG. 5
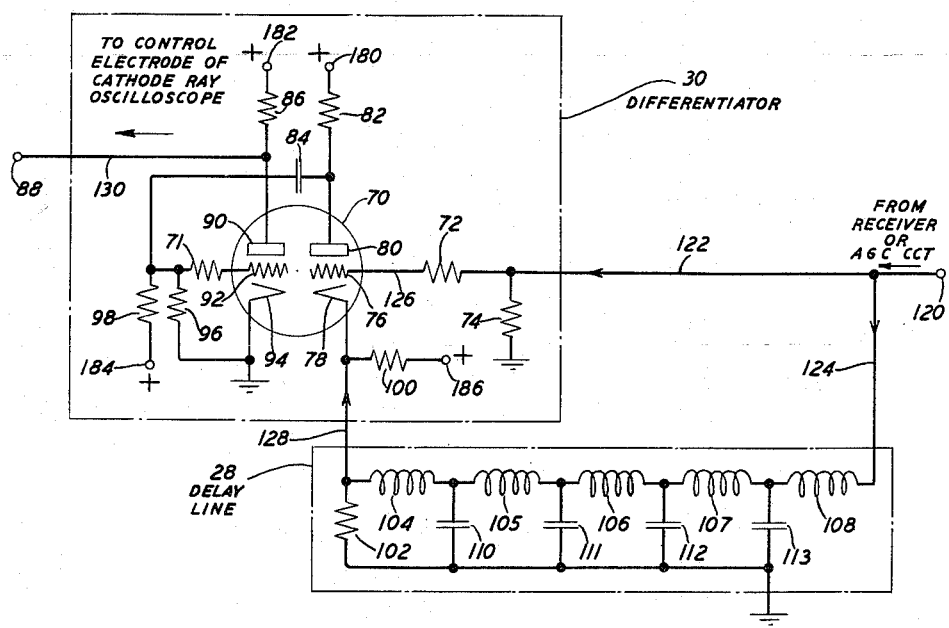
FIG. 6
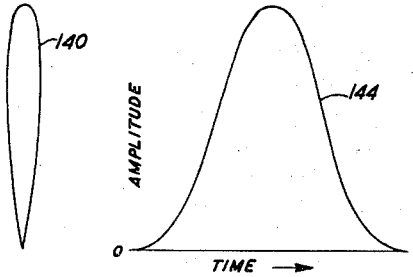
FIG. 7
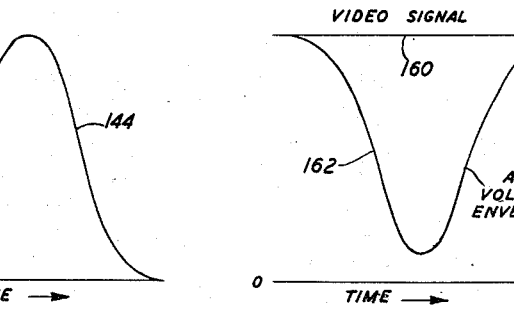
FIG. 10
INVENTORS: B. OSTENDORF JR.
W. T. REA
BY
H. O. Wright
ATTORNEY

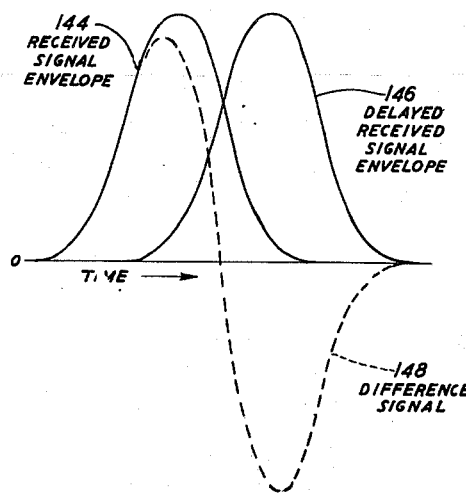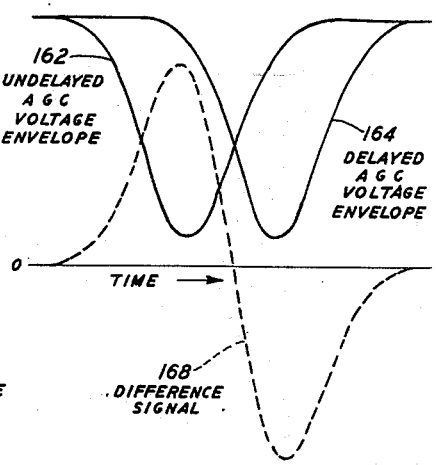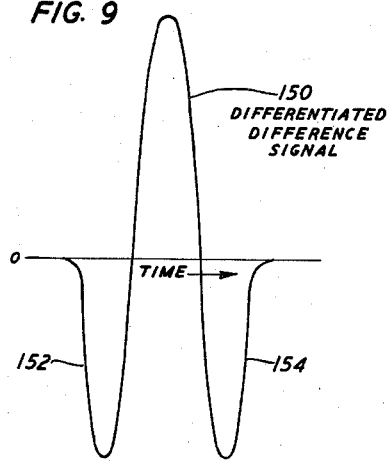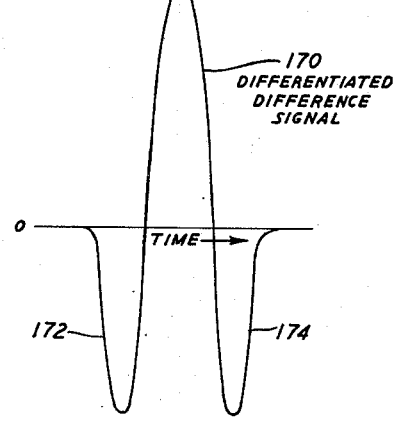

Patented Mar. 27, 1951

2,546,370

UNITED STATES PATENT OFFICE 2,546,370

AZIMUTH INDICATING CIRCUIT

Bernard Ostendorf, Jr., Stamford, Conn., and Wilton T. Rea, Manhasset, N. Y., assignors to Bell Telephone Laboratories, Incorporated, New York, N. Y., a corporation of New York Application August 31, 1948, Serial No. 47,064

9 Claims. (Cl. 343—118)

This invention relates to improved circuits for increasing the azimuthal accuracy of energy reflection type object detecting direction and/or range indicating systems. More particularly it relates to such systems in which a highly directive beam emitting or receiving device is caused to continuously scan at least a sector of the area about an observation point at which the system is located. Systems of the invention can employ, continuous wave, pulsed, frequency modulated or otherwise modulated, energy, which energy can be radio, sonic, infra-red, or the like, in accordance with any of a large number and variety of systems known to those skilled in the art.

Specific uses of especial value are in radar systems of the general type employed for locating enemy mortars or for determining the point in the target area struck by a mortar shell fired by an associated mortar battery. In these uses the radar system is employed to spot the mortar shell (i. e., to give its range and direction from the observation point), at several points along its trajectory (two points may be sufficient) and the trajectory is thereafter extended and the location of the mortar, or of the shell impact point, is then determined by calculation, aided by a knowledge of the characteristics of the specific type of weapon and the type of missile being employed.

It will be obvious from the following description, however, that circuits of the invention can be employed in many other uses of object detecting and/or ranging systems of the types mentioned above and that the invention is in no way limited to the specific systems employed for illustrative purposes in this application.

In accordance with the principles of the invention, the improved accuracy of azimuthal indications, heretofore obtainable only by the well-known expedient of "lobe-switching," described, for example, in United States Patent 2,424,982 to W. H. C. Higgins et al., granted August 5, 1947, is substantially achieved by circuital arrangements, specific embodiments of which will be described in detail hereinunder, which eliminate the necessity of actually "switching the antenna lobe" and carefully aligning the common axis of the switched lobes with the object whose azimuth is to be accurately determined.

This is advantageous in systems of the type contemplated in connection with the present invention, since it permits the scanning operation to be carried out without interruptions such as would be required were it necessary to employ a lobe-switching arrangement to obtain the desired degree of accuracy of the azimuthal directional indications.

In direction indicating systems where a sharply directive beam is swept through an angle (i. e. where the beam scans a sector) as contemplated in connection with the system of the present invention, the envelope of the reflected signals, received from a reflecting object within the sector scanned, is a rounded curve approximating, in its general shape, a half cycle of a sine wave.

The point of maximum amplitude of this curve represents the reflection received from the energy transmitted at the instant that the axis of the energy beam was directed squarely, or accurately, at the reflecting object. The amplitudes of the received reflections from a particular object, of course, increase from relatively small values between the instant the edge of the energy beam just starts to impinge upon the object and the instant at which it is pointed accurately toward the object. As the scanning action is continued beyond the point of maximum amplitude, the amplitude of the received reflections from the particular object decrease in substantially the same manner in which they increased, as described above, falling to zero when the beam no longer impinges at all upon the object.

Since the sharpest energy beams which can be conveniently produced with practicable antennas, or energy projecting or receiving means, of convenient physical dimensions to permit relatively rapid scanning, are commonly at least one or more degrees in width (i. e. flat or blunt throughout an angle of at least one or more degrees at the "nose" or outermost extremity of the beam) the point of maximum amplitude of the above-mentioned sine-like envelope curve will not be sharply defined within the limits of the blunt portion of the beam. In other words, the amplitude envelope of the received reflections will, like the exploratory beam, also be relatively flat or blunt for at least one or more degrees about the point of maximum amplitude.

In "lobe-switching" systems, as described in the above-mentioned patent to Higgins et al., and numerous other patents and publications, the flat or blunt maximum of the envelope of received reflections is resolved by switching the lobe alternately between two positions on opposite sides of and displaced from the nominal axis of the antenna system by an angle substantially equal to half the angle over which the "nose"

of the envelope is nearly flat, so that, when the antenna axis is pointing directly at the reflecting object, the amplitude envelopes of received reflections for the two lobe positions will be substantially identical. Such an arrangement, however, requires that the antenna be held stationary or be very slowly rotated until the envelopes of the received reflected signals for the two lobe positions are matched. "Lobe switching," therefore, cannot be used where it is desired to continuously scan a sizeable sector with at least moderate rapidity.

An effect, in a number of respects analogous to and of equal value with "lobe switching," can, however, be obtained by employing the principles of the present invention in numerous ways including any one of the following described ways.

For example, a portion of the energy (preferably about half) of the envelope of the received reflections from a particular reflecting object can be delayed by an interval corresponding to substantially half the width of the flat maximum portion of said envelope, after which it can be subtracted from the undelayed portion of the envelope by recombining it in opposite polarity with respect to the undelayed portion. The resulting difference wave, or amplitude curve, will then closely approximate a full cycle of a sine wave which passes through zero amplitude at the point at which the delayed and undelayed portions of the envelope have equal amplitude.

By differentiating the resulting difference wave, a sharp positive pulse can be obtained coincident with the point at which the difference wave passes through zero. Smaller amplitude negative pulses will be obtained at points of the difference wave having maximum reverse slope (i. e. points of inflection). The negative pulses can then be "wiped off" by a vacuum tube circuit biased to respond only to positive pulses and the sharp positive pulse can be employed to provide a sharp indication on a cathode ray oscilloscope, or similar indicating device, the marking member of which indicating device is deflected in synchronism with the azimuth scanning action of the highly directive antenna. A correction of half the delay introduced in delaying the envelope should, of course, be introduced in the azimuth sweep since the point of equal amplitude of the delayed and undelayed envelopes will be half-way between their respective maxima and the zero point of the difference wave will therefore occur at an instant later, by half the total delay, than the maximum of the undelayed envelope.

A modification of the above-described procedure facilitates the ready application of the principles of the invention to radar systems, and the like, in which it is desired to employ an automatic gain control circuit in connection with the receiving apparatus in order that the receiving amplifiers will not become overloaded by strong reflected signals or by interfering signals received from other direction and ranging systems or from communication systems in the vicinity employing substantially the same wavelength of energy.

In order to stabilize the video signal it is necessary that the automatic gain control circuit signal should vary in accordance with (i. e. substantially reproduce) the amplitude envelope of the received reflections from a particular reflecting object. It is entirely practicable therefore to make use of a portion of the automatic gain control signal in the same manner as was described above for the envelope of the received reflections. This modification will be included in an illustrative embodiment of the invention which will be described in detail below.

A principal object of the invention is to provide means for improving the azimuthal accuracy of indications furnished by sector scanning pulse reflection type object detecting and ranging systems and the like.

Other and further objects will become apparent during the course of the following description and from the appended claims.

The nature and principles of the invention will be more readily understood from the description hereinunder of illustrative embodiments thereof together with the accompanying drawings in which:

Fig. 1 shows in block diagram form a radar system incorporating the principles of the invention;

Fig. 2 shows in block diagram form a radio receiving system adapted to provide indications of the directions of beacon stations the accuracy of which indications is improved by application of the principles of the invention;

Fig. 3 shows an indication of the type provided by the system of Fig. 2;

Fig. 4 shows in block diagram form a radar system incorporating the principles of the invention and operating on the automatic gain control signal;

Fig. 5 shows, in electrical schematic diagram form, delay line and differentiator circuits suitable for use in the systems of the invention;

Fig. 6 illustrates a typical lobe pattern for directional antennas employed in sector scanning radio and radar systems;

Fig. 7 illustrates the amplitude envelope of the reflected signals received from a beacon station, or from a reflecting object, by the antenna of a typical sector scanning radio, or radar, system;

Fig. 8 illustrates the combination in opposing polarity of the received signal envelope and the delayed signal envelope to obtain the difference signal employed in the systems of the invention;

Fig. 9 illustrates the sharp positive pulse and two minor negative pulses obtained by differentiating the difference signal of Fig. 8;

Fig. 10 illustrates the amplitude envelope of the automatic gain control signal obtained in sector scanning radio beacon or radar systems of the invention;

Fig. 11 illustrates the combination of the automatic gain control signal in opposing phase with the delayed automatic gain control signal to provide the difference signal employed in systems of the invention; and Fig. 12 illustrates the sharp positive pulse and two minor negative pulses obtained by differentiating the difference signal of Fig. 11.

In more detail in the block schematic diagram of Fig. 1 the principles of the invention are shown incorporated, in one form, in an otherwise conventional pulse reflection type of radar system.

Numerous characteristic types of radar systems and the various conventional forms with which component units of radar systems usually conform are described in detail and illustrated in many publications, including the books "Radar System Engineering" by Ridenour and "Radar Engineering" by Terman, both published in 1947 by McGraw-Hill Book Company, New York, New York. Synchronizer 26 can be of any of the numerous types well-known to those skilled in the art, for example a multivibrator circuit, which furnishes a series of short pulses to operate radio transmitter 34. Radio transmitter 34 can preferably be of the type employing a magnetron to generate high power microwave pulses of short duration, for example, 1-microsecond pulses of 3,000 megacycles frequency and 25 or more kilowatts instantaneous power.

A highly directional antenna system, for example, a dipole 20, located at the focal point of a parabolic reflector 22, is employed to direct the high power pulses furnished to it by transmitter 34 toward areas in which the presence of reflecting objects is to be detected.

The TR box 32 can be of any of the conventional types in which a resonant cavity is detuned by the breakdown of a gas-filled tube which effectually short circuits the cavity during the high power transmitted pulses. This protects receiver 36 from the high power transmitted pulses. Box 32 recovers substantially instantaneously upon the cessation of a transmitted pulse and permits the ready passage of reflections of the transmitted pulses to the receiver 36.

Motor 46 drives antenna assembly 20, 22 by means of shaft 38 causing the antenna assembly to turn or oscillate and repeatedly scan the sector which is to be explored by the system.

A two-phase generator 42 is likewise turned by motor 46 in synchronism with the turning movements of the antenna system and provides quadrature voltages which at any instant represent the azimuthal direction in which the antenna beam is instantly being directed.

A saw-tooth wave generating sweep circuit is actuated by pulses from synchronizer 26 which synchronize the start of each saw-tooth sweep wave with the emission of a pulse by transmitter 34 and antenna system 20, 22.

Combining circuit 50 combines the saw-tooth sweep wave from circuit 48 with the two-phase voltages from generator 42 modulating the latter in the manner, for example, described for modulator 74 of Fig. 1 of Patent 2,421,747, granted June 10, 1947, to G. B. Engelhardt. The function of delay lines 37 will be described hereinunder. Generator 42 can be, for example, preferably the same as generator 16 of Fig. 1 of the abovementioned patent to Engelhardt. The two-phase voltages from generator 42 are, after modulation by the saw-tooth wave of sweep circuit 48, applied to the horizontal and vertical deflecting plates 54, 54, and 56, 56, respectively, of the cathode ray oscilloscope 52.

Alternatively, where the radar system is to be employed for scanning a relatively narrow sector of azimuth and for establishing the position of a straight line trajectory in the sector, the "trapezoidal B" type (or class) of indication and appropriately modified indicating circuits, are preferably used. Representative arrangements of this character are described and claimed in applicant W. T. Rea's copending application Serial No. 47,065, filed August 31, 1948, concurrently with this application.

Receiver 36 converts the received reflected radio frequency pulses to an intermediate frequency (60 megacycles, for example), amplifies them an appropriate amount and then detects them as video frequency pulses (0 to 4 megacycles, for example) further amplifying them, as may be necessary to produce indications on the cathode ray oscilloscope of sufficient brightness to be readily seen.

The output of receiver 36 is divided in two substantially equal parts, one part passing directly over circuit 24 to the differentiator 30, the other passing over circuit 25 to delay line 28 and then to differentiator 30. Suitable forms for differentiator 30 and delay line 28 are shown, for example, in Fig. 5 and will be described in detail hereinunder in connection with Fig. 5.

The output of differentiator 30 is connected to control grid 58 of cathode ray oscilloscope 52.

The system of Fig. 1 will provide a plan position indication of the general type illustrated by Fig. 7 of the above-mentioned patent to Engelhardt. Increased accuracy of the azimuth angle indication for any particular reflecting object will, however, be realized by the operation of the circuits including delay lines 28 and 37 and differentiator 30. The operation of these circuits will be discussed in detail below in connection with the curves shown in Figs. 6 to 9, inclusive.

In Fig. 2 a radio system is shown which is suitable, for example, for scanning the area about it to detect the direction of radio beacon transmitting stations. It is, in essence, a simplification of the radar system of Fig. 1, and produces a simple circular indication as shown in Fig. 3. No transmitter is required since it is employed simply to determine the respective directions only, of radio beacon stations, from which beacon stations energy is transmitted.

Substantially as for the case of the radar system of Fig. 1 (when sweeping a sector in which a reflecting object is located), in the system of Fig. 2, when sweeping a sector in which a beacon station transmitter is located, the amplitude envelope of the received signal from the beacon station transmitter will be a curve approximating a half cycle sine wave.

Obviously, this received signal envelope can be delayed and the delayed signal can then be combined in opposed phase relation with the original signal to obtain a difference signal. The difference signal will of course pass through zero at the point where the combined signals are of equal amplitude and it can therefore be differentiated to give a sharp positive pulse centered at that point precisely as in the case of the radar system of Fig. 1. Like units of the systems of Figs. 1 and 2 are given like designation numbers and the description given in connection with Fig. 1 of each specific unit applies directly to the like unit of Fig. 2.

Because the system of Fig. 2 is not designed to indicate range there is no need for the saw-tooth sweep wave generating circuit 48 of Fig. 1 or of the combining circuit 50 of Fig. 1 in the system of Fig. 2.

Because no transmitter is employed in connection with the system of Fig. 2 there is also, obviously, no need for the synchronizer 26 or the TR box 32 of Fig. 1 in the system of Fig. 2.

The quadrature or two-phase voltages from generator 42 of Fig. 2 are applied directly (except for delay lines 37 whose function will be described in detail hereinunder) to the horizontal and vertical deflecting plates 54, 54 and 56, 56, respectively, and cause the ray of cathode ray oscilloscope 52 to follow a circular trace such as trace 64 of Fig. 3. The receipt of a signal from a transmitting beacon station results, as described above, in the formation at the output of differentiator 30 of a sharp positive pulse which is applied to the intensity control element 58 of the cathode ray oscilloscope 52. The ray is thereby momentarily increased in intensity producing a bright spot indication such as spot 62 of Fig. 3, on the trace 64, the angular position of which with respect to the center of the cathode ray screen is a direct indication of the azimuth angle of the beacon station from the antenna of the system of Fig. 2. A calibration scale in degrees as indicated in Fig. 3 by the markings such as 0°, 90°, 180° and 270° etc., can be associated with, or engraved upon, the screen of the cathode ray tube to facilitate the determination of the angle of the spot indication with respect to some arbitrary "zero" angle which, conventionally, can be a compass direction, such as north, or, alternatively, the heading of the craft, where the system of Fig. 2 is employed on a mobile craft.

In Fig. 4, a modification of the radar system of Fig. 1 is shown in which an automatic gain control circuit 27 is provided for the receiver 36 to maintain the output level of receiver 36 substantially constant during the receipt of reflected pulses from a reflecting object. Such circuits are well known in the amplifier art and, as is well known to those skilled in the art, the envelope of the automatic gain control circuit signal will be substantially an inverted duplicate of the envelope of the received signal. The envelope of the automatic gain control can, therefore, be used, in accordance with the principles of this invention, in lieu of the envelope of the received signal. A portion of the automatic gain control signal envelope is therefore directed to the circuit including delay line 28 and differentiator 30, one subportion thereof being delayed and then combined in opposite phase with a subportion transmitted directly to differentiator 30. The resulting difference signal is differentiated and a sharp positive pulse is obtained at the point where the difference signal passes through zero. This positive pulse is applied to the intensity control element 58 of cathode ray oscilloscope 52 and an intense spot indication is thus caused to appear on the screen of the oscilloscope at an angle corresponding to the azimuth angle of the object from which reflected pulses were received and at a distance from the center of the screen which is a measure or indication of the distance of the reflecting object from the radar system. Like units of the radar systems of Figs. 1 and 4 are given like designation numbers and the descriptions of these units given in connection with Fig. 1 are directly applicable to the corresponding units of Fig. 4.

The system of Fig. 4 can preferably be provided with a second cathode ray oscilloscope 49, the horizontal deflecting plates a, a of which are connected to the saw-tooth wave sweep generator 48 and the vertical deflecting plates b, b of which are connected to the output of receiver 36 so that an "A" type (or class) indication, showing a horizontal range trace on which the received reflected pulses will appear as vertical deflections in accordance with conventional practice in the radar art. This oscilloscope will serve the purpose of a monitor to indicate whether reflected pulses are being received and from approximately what range, so that a failure of the more complex circuits involving any one of the units 27, 28, 30, 52, etc., will be at once apparent. It can also, of course, be employed in connection with gating systems, well known in the art, in which a gating pedestal or notch is aligned on the "A" scope with a particular reflected signal the automatic gain control circuit then being gated (or made responsive) only to the selected signal. Such systems are shown, for example, in the copending application of A. G. Fox Serial No. 448,099 filed June 23, 1942, Patent No. 2,534,862, dated December 19, 1950. An arrangement of this type is not shown in Fig. 4 since it is well known in the art and would greatly complicate the drawing and probably obscure the circuital operations primarily related to the principles of the present invention. It should be understood however that such arrangements can be used to advantage with systems of the present invention.

In Fig. 5, electrical schematic diagrams of suitable forms of the delay line 28 and differentiator 30 are shown.

Delay line 28 can comprise five series-connected inductances 104 to 108, inclusive, with four "shunt" capacitors 110 to 113, inclusive, the capacitors being connected from successive junction points between the series inductances and ground, as shown in Fig. 5. A resistor 102 is connected across the output of the delay line to provide an appropriate impedance for so terminating it as to avoid reflections of the delayed energy wave. The input of delay line 28 connects to terminal 120 via conductors 124 and 122.

The differentiator 30 comprises a double triode vacuum tube 70, the cathodes, control electrodes and anodes of which are designated 94, 78; 92, 76 and 90, 80, respectively, from right to left as shown in Fig. 5.

The undelayed and delayed portions of the signal or AGC voltage envelope, such as are shown for example by curves 162 and 164 of Fig. 11, are subtracted by virtue of the fact that the former is applied via resistor 72 to grid 76 and the latter is applied to cathode 78 of the right-hand triode of double-triode tube 70. In the absence of signal, the potentiometer formed by resistors 100 and 102 maintains cathode 78 more positive than grid 76 by an amount sufficient to prevent the flow of plate current in this triode. Consequently, plate 80 is at a high positive potential at this time.

The initial portion of the undelayed signal envelope voltage 162 moves grid 76 toward negative but this has no effect on the plate current. Thereafter, grid 76 becomes more and more negative with respect to cathode 78 until the undelayed signal envelope ceases to increase as fast as the delayed signal envelope. Thereafter, grid 76 becomes less and less negative with respect to cathode 78 and eventually the difference of potential is sufficiently small that plate current begins to flow. At this time instant the undelayed signal envelope voltage is becoming less negative and the delayed voltage more negative, so that the difference of potential between grid 76 and cathode 78 is rapidly decreased to zero, after which grid 76 becomes more positive than cathode 78. Plate current, therefore, builds up rapidly and the potential of plate 80, of the right-hand triode of tube 70, falls suddenly to a low value.

Until this instant of time the potential of grid 92 of the left-hand triode of tube 70, has been maintained positive by the potentiometer comprising resistors 96 and 98. The positive voltage actually appearing at the grid is, however, limited to a very small value by the flow of grid current through resistor 71. Plate 90 of the left-hand triode of tube 70 has been at a low positive potential because of the flow of plate current. The sudden fall in the potential of plate 80 of the right-hand triode of tube 70 that occurs as the voltages of the undelayed and delayed signal envelopes approach the same value, as described at length above, is applied via differentiating condenser 84 to grid 92. This drives grid 92 negative, cutting off the flow of plate current and causing plate 90 to go rapidly toward positive. Condenser 84 then discharges quickly through the parallel combination of resistors 96 and 98, returning grid 92 to a positive potential and again forcing plate 90 to a low positive potential. Thus a positive impulse is applied to the control electrode of the cathode ray oscilloscope via lead 130.

At a later instant near the end of the undelayed signal envelope, grid 76 again becomes negative with respect to cathode 78. This cuts off the flow of plate current, allowing plate 80 to return to a high positive potential. The resulting positive surge of voltage, applied via condenser 84 to grid 92, does not appreciably affect the potential of plate 90 because grid 92 is already at a positive potential. A further excursion toward positive merely increases the flow of grid current, said current being limited by resistor 71, and the potential drop through said resistor 71 acting to maintain grid 92 near the potential of cathode 94.

As will be obvious to those skilled in the art, the impulse applied to the control electrode of the cathode ray oscilloscope via lead 130 may be sharpened and shortened to any desired degree by including additional amplifying, limiting, and clipping means, many forms of which are well known in the art, between plate 80 and the differentiating condenser 84.

The curve 140 of Fig. 6 represents the relative amplitude envelope of the directive lobe of a typical antenna arrangement to be employed with systems embodying the principles of the present invention, such as dipole 20 with reflector 22 of Figs. 1, 2 and 4. It should be noted that the upper end of curve 140, representing the maximum amplitude for either transmission or reception, is relatively blunt, or substantially uniform, over an angle of several degrees.

Accordingly, in Fig. 7, curve 144 of which represents the amplitude envelope of the signals received from a reflecting object, or from a beacon transmitter, as the antenna system lobe is swept through a sector in which a reflecting object, or beacon transmitter, is located. Curve 144 rises quite sharply with time from the instant the edge of the antenna lobe first impinges upon the object, or first begins to receive energy from the beacon transmitter, until nearly maximum amplitude of signal is being received. For a short interval following the attainment of nearly maximum amplitude the change in amplitude is relatively very gradual and thereafter the amplitude rapidly decreases toward zero again as the antenna lobe leaves the reflecting object or beacon transmitter.

In Fig. 8 the operation of arrangements of the invention, of the type illustrated in Figs. 1 and 2, is illustrated. A portion of the received signal envelope 144 is delayed by passing through delay line 28 and the resulting envelope 146 is thus obtained which, except for being delayed in time, is a duplicate of envelope 144. The two envelopes are then combined in opposed polarity to obtain the difference signal 148 which passes through zero at the point at which envelopes 144 and 146 are of equal amplitudes.

The difference curve 148 of Fig. 8 is then differentiated by differentiator 30 of Figs. 1, 2 and 5 and the curve of Fig. 9 is obtained. The curve of Fig. 9 comprises a sharp positive pulse 150 and two minor negative pulses 152, 154. The negative pulses are eliminated as described in connection with Fig. 5 and the sharp positive pulse is applied to the intensity control electrode of the cathode ray oscilloscope 52 of Figs. 1 and 2.

It is obvious from the curves of Figs. 8 and 9 that the sharp positive pulse 150 of Fig. 9 occurs at a point half-way between the center points of the maximum amplitude regions of envelopes 144, 146 of Fig. 8. It is therefore delayed with respect to the center point of the maximum amplitude region of the envelope 144 by half the delay introduced in obtaining envelope 146. In order to bring the indication accurately to the precise azimuth angle on the oscilloscope therefore it is necessary to compensate for the delay of the sharp positive pulse with respect to the center point of the maximum amplitude region of the envelope 146. Obviously, this can be accomplished by any one of a number of ways. For example, the outputs of the two-phase generator 42 of Figs. 1 and 2 can be passed through delay lines 37. The delay lines 37 should, of course, be designed, in accordance with principles well known to those skilled in the art, to provide one-half the time delay provided by the delay network 28. They can, of course, be of the same general type of construction and electrical configuration as described above in detail for delay line 28. Alternatively, the delay lines 37 can be omitted and the required delay can be introduced by appropriate mechanical adjustment of the rotor or stator positions of generator 42. As a further alternative, a calibrated scale showing azimuth angles can be associated with the screen of oscilloscope 52, the calibrated scale being oriented to compensate for half the delay introduced by the delay line 28. Where the antenna is oscillated back and forth through an arc a continuously rotating eccentric can be employed to drive both the antenna and the azimuth voltage generator, the required delay for the latter being obtained by mechanically positioning its drive point on the eccentric with respect to that of the antenna to provide the desired delay. Those skilled in the art can readily devise a large number of suitable mechanical drives of this character.

The operation of the system of the invention illustrated in Fig. 4 is, in essence, substantially the same as for the systems of Figs. 1 and 2, except that the envelope of the automatic gain control signal developed in the automatic gain control circuit 27 is employed in place of the envelope of the received signal. This operation is illustrated by the curves of Figs. 10 to 12, inclusive. In Fig. 10, 160 is the amplitude envelope of the received video signals during the interval the antenna lobe is sweeping past a reflecting object, or a beacon transmitter, and is a straight line by virtue of the gain controlling action of the automatic gain control circuit 27. The amplitude envelope of the automatic gain control voltage 162, however, is essentially a replica of the amplitude envelope 144 of Fig. 7, except that it is inverted in phase. It can therefore be employed in the same general way as described above for the envelope 144. In Fig. 11, therefore, the envelope 162 is delayed to give the delayed AGC voltage envelope 164, which is combined in opposed phase relation with the envelope 162 to give the difference signal 168. Signal 168 is differentiated in a circuit such as is shown in Fig. 5 for differentiator 30 to produce a sharp positive pulse 170 and two minor negative pulses 172, 174, the latter being suppressed and the sharp positive pulse 170 being transmitted to the intensity control electrode 58 of oscilloscope 52, precisely as described above for the systems of Figs. 1 and 2. Again the sharp positive pulse 170 is delayed from the center point of the maximum amplitude region of the undelayed AGC envelope by half the delay introduced by the delay line 28 so that compensation should again be introduced equal to one-half the delay of line 28. As for the previously discussed systems, this can be effected electrically by inserting delay lines 37 in the output of two-phase generator 42, or delay lines 37 can be omitted and the compensation effected by an eccentric mechanical drive or by mechanical adjustment of the stator-rotor phase relation, or finally compensation can be effected by the positioning of a calibrated azimuth angle scale associated with the screen of the oscilloscope 52.

The above described arrangements are merely illustrative of the ways in which the principles of the invention can be applied. Numerous and various other arrangements can readily be devised by those skilled in the art within the spirit and scope of the invention. For example the principles of the invention can, obviously, be applied readily to afford more accurate azimuth indications in directional indicating systems employing sonic, ultra-sonic, infra-red, and other forms of energy. The principles of the invention are, likewise, obviously applicable to direction and/or ranging systems employing continuous wave transmision and in which frequency modulation, phase comparison, or amplitude comparison, methods of distance determination are employed.

What is claimed is:

1. In a directional indicating system of the sector scanning type in which a highly directive exploratory energy receiving device is swept through said sector, means for obtaining an amplitude envelope of the received signals, means for delaying said amplitude envelope by a predetermined time interval, means for combining said delayed envelope with said undelayed envelope in opposed phase relation to obtain a difference signal, means for differentiating the difference signal to obtain a sharp positive pulse and means for producing an indication of direction from said sharp positive pulse.

2. In a direction indicating system in which a directive antenna is caused to scan an area to determine the direction of a source of radiation, the combination which comprises a receiving and detecting apparatus connected to said antenna and adapted to produce an amplitude envelope wave of the radiation received as said antenna scans through the direction of said source of radiation, a delay structure connected to the output of said receiving and detecting apparatus, a differentiating circuit connected to the output of said receiving and detecting apparatus and to the output of said delay circuit, said last-mentioned connection being in opposed polarity relation to said first-mentioned connection, and an indicating device connected to the output of said differentiating circuit, said indicating device being of the type which produces a time versus amplitude indication and a synchronizing circuit synchronizing the timing action of said indicating device with the scanning action of said antenna.

3. A sector scanning radio directional indicating system which includes a highly directive antenna system, means for turning said antenna system to scan a sector, receiving apparatus connected to said antenna system, said receiving apparatus including means for detecting the amplitude envelope of received radio signals, means for delaying said envelope a predetermined amount and combining it in opposed polarity relation with the undelayed envelope to obtain a difference signal, means for differentiating said difference signal to obtain a sharp pulse and indicating means responsive to said sharp pulse to produce an indication.

4. A sector scanning radio directional indicating system which includes a highly directive antenna system, means for turning said antenna system to scan a sector, receiving apparatus connected to said antenna system, an automatic gain control circuit cooperatively associated with said receiving apparatus to maintain the gain of said apparatus constant during the recepton of radio energy, a delay line connecting to said automatic gain control circuit, a differentiating circuit connecting to said delay line and directly to said automatic gain control circuit in opposed phase relation, a directional indicator including a movable marking member, said indicator being cooperatively associated with said turning means to move said marking member over a predetermined path in synchronism with the turning of said antenna, and means responsive to the output of said differentiating circuit to actuate said marking member upon receipt of a sharp energy pulse from said differentiating circuit.

5. The combination of claim 1 with means for delaying the azimuthal sweep of said direction indicating means to compensate for the delay of said sharp positive pulse with respect to the maximum amplitude point of said undelayed amplitude envelope of said received signals.

6. The method of obtaining a more accurate directional indication from signals received by a rotationally moving antenna which comprises delaying a portion of the amplitude envelope of said signals, subtracting said delayed portion of said amplitude envelope from the undelayed portion of said envelope and deriving an indication from the passage of the difference signal thus obtained through a null point.

7. The method of claim 6 with the additional step of compensating for the delay of the indication obtained from said difference signal with respect to the maximum amplitude point of said undelayed portion of said envelope.

8. The combination of claim 2 and means for compensting the directional indication for the delay of the indication received from said differentiating circuit with respect to the point of maximum amplitude of the undelayed received amplitude envelope wave.

9. The combination of claim 4 and means for compensating for the delay of said sharp energy pulse from said differentiating circuit with respect to the point of maximum amplitude of said undelayed amplitude envelope of said received signal.

BERNARD OSTENDORF, Jr.
WILTON T. REA.

REFERENCES CITED

The following references are of record in the file of this patent:

UNITED STATES PATENTS

| Number | Name | Date |
| --- | --- | --- |
| 2,437,313 | Bedford | Mar. 9, 1948 |
| 2,456,666 | Agate et al. | Dec. 21, 1948 |